US010268628B2

(12) United States Patent
Chuang et al.

(10) Patent No.: US 10,268,628 B2
(45) Date of Patent: Apr. 23, 2019

(54) METHOD FOR EXTRACTING BIOS ATTRIBUTES FOR BIOS MANAGEMENT AND SYSTEM THEREFOR

(71) Applicant: DELL PRODUCTS, LP, Round Rock, TX (US)

(72) Inventors: Franklin Chuang, New Taipei (TW); Xiaomei Miller, Round Rock, TX (US)

(73) Assignee: Dell Products, LP, Round Rock, TX (US)

( * ) Notice: Subject to any disclaimer, the term of this patent is extended or adjusted under 35 U.S.C. 154(b) by 58 days.

(21) Appl. No.: 15/363,483

(22) Filed: Nov. 29, 2016

(65) Prior Publication Data

US 2018/0150302 A1    May 31, 2018

(51) Int. Cl.
  G06F 15/00    (2006.01)
  G06F 13/42    (2006.01)
  G06F 12/02    (2006.01)
  G06F 9/445    (2018.01)
  G06F 8/654    (2018.01)

(52) U.S. Cl.
  CPC ...... *G06F 13/4282* (2013.01); *G06F 9/44505* (2013.01); *G06F 12/0238* (2013.01); *G06F 8/654* (2018.02); *G06F 2212/202* (2013.01)

(58) Field of Classification Search
  None
  See application file for complete search history.

(56) References Cited

U.S. PATENT DOCUMENTS

| 8,522,005 | B2 | 8/2013 | Mahmoud et al. | |
|---|---|---|---|---|
| 8,583,906 | B2* | 11/2013 | Harmer | G06F 9/451 713/1 |
| 8,903,967 | B2* | 12/2014 | Murphy | G06F 8/665 709/221 |
| 2012/0260077 | A1 | 10/2012 | Harmer et al. | |

* cited by examiner

*Primary Examiner* — Cheng Yuan Tseng
(74) *Attorney, Agent, or Firm* — Larson Newman, LLP (57) ABSTRACT

A method includes parsing basic input/output system (BIOS) information to collect configuration attributes defining configurable features at an information handling system. A configuration attribute file is generated that includes the configuration attributes. The configuration attribute file is stored at a BIOS non-volatile random-access memory (NVRAM) at the information handling system and is accessible during initialization of the information handling system by BIOS instructions.

18 Claims, 4 Drawing Sheets

METHOD FOR EXTRACTING BIOS ATTRIBUTES FOR BIOS MANAGEMENT AND SYSTEM THEREFOR

FIELD OF THE DISCLOSURE

This disclosure relates generally to information handling systems, and more particularly relates to extracting BIOS attributes for BIOS management at an information handling system.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems. A unified extensible firmware interface (UEFI) can provide an interface between the hardware and firmware of the information handling system and an operating environment of the information handling system.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

SUMMARY

An information handling system may include a management engine to provide out-of-band management services, and a non-volatile random-access memory (NVRAM) for storing a basic input/output system (BIOS). The NVRAM may store a configuration attribute file identifying attributes configurable by a management system, and a Platform Level Data Model (PLDM) management profile that may be accessible by the management engine. The configuration attribute file may be generated prior to initialization of the information handling system based on BIOS source information, and the PLDM management profile may be generated during BIOS initialization of the information handling system based on current values of the configuration attributes identified in the configuration attribute file.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can certainly be used in this application. The teachings can also be used in other applications, and with several different types of architectures, such as distributed computing architectures, client/server architectures, or middleware server architectures and associated resources.

FIGS. 1-4 illustrate techniques for managing configuration options available at an information handling system. The configuration options define configurable devices and operating features of the information handling system. The configuration options can be provided by data structures compliant with the Unified Extensible Firmware Interface (UEFI) and Human Interface Infrastructure (HII) standard architecture. In order to facilitate remote management of the information handling system, a list of configuration attributes can be abstracted from the HII information and presented in a concise attribute table, such as a Platform Level Data Model (PLDM) management profile promulgated by the Distributed Management Task Force, Inc. (DTMF). As disclosed herein, the attribute table is generated based on a proprietary configuration attribute file stored at a basic input/output system (BIOS) non-volatile random access memory (NVRAM) included at the information handling system. The configuration attribute file can be generated at a build time of the BIOS image, or otherwise prior to initialization of the information handling system. The configuration attribute file is stored at the BIOS NVRAM as part of a corresponding BIOS image. During initialization of the information handling system, BIOS firmware accesses the configuration attribute file, updates configuration attribute values, generates a PLDM management profile, and stores the profile at a partition of the BIOS NVRAM that is accessible to a management engine included at the information handling system. By generating the configuration attribute file prior to initialization of the information handling system, the time required to perform power-on and initialization of the system is greatly reduced.

Figure 1:
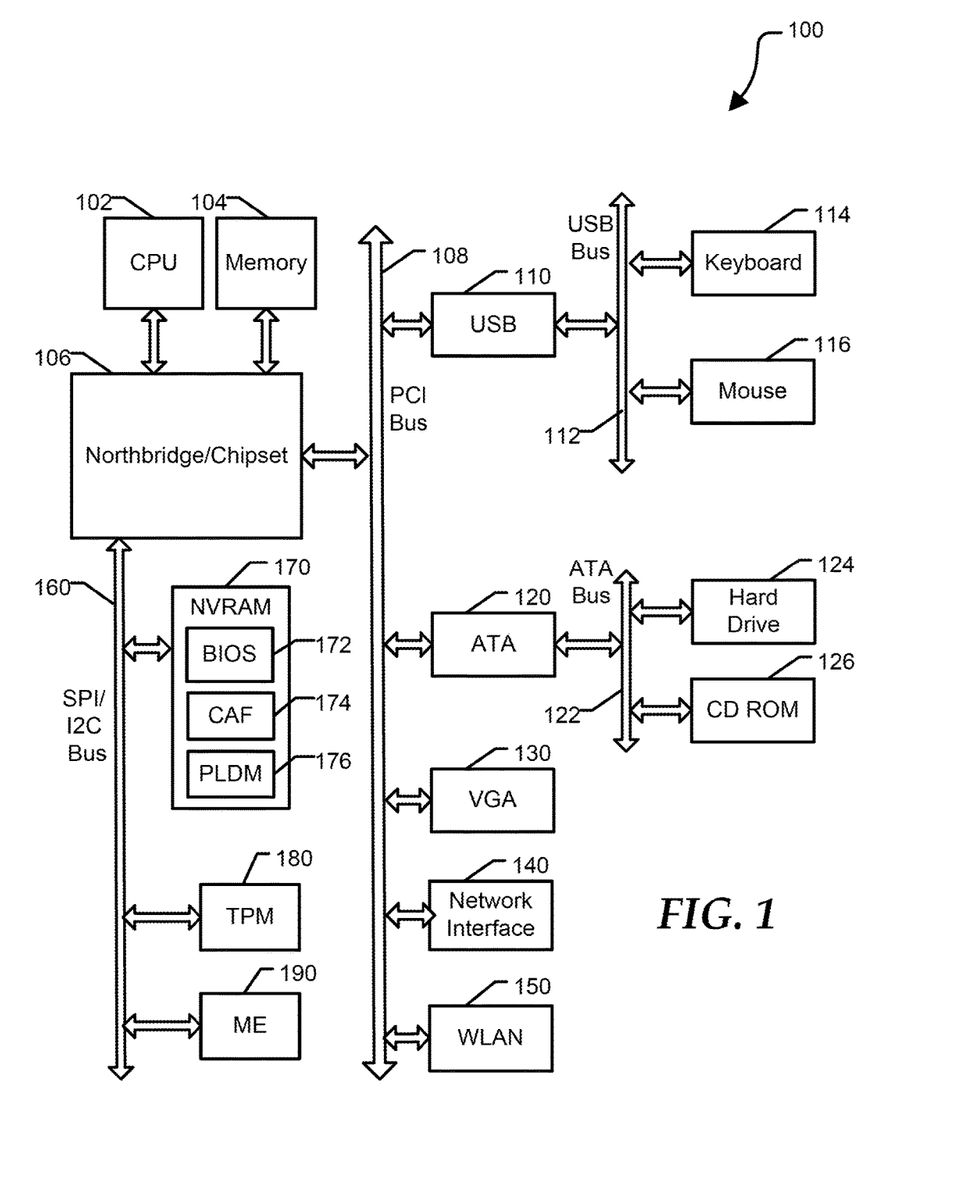
FIG. 1 is a block diagram of an information handling system according to an embodiment of the present disclosure.

FIG. 1 illustrates an information handling system 100 including a processor 102, a memory 104, a northbridge/chipset 106, a PCI bus 108, a universal serial bus (USB) controller 110, a USB 112, a keyboard device controller 114, a mouse device controller 116, an ATA bus controller 120, an ATA bus 122, a hard drive device controller 124, a compact disk read only memory (CD ROM) device controller 126, a video graphics array (VGA) device controller 130, a network interface controller (NIC) 140, a wireless local area network (WLAN) controller 150, a serial peripheral interface (SPI) bus 160, a NVRAM 170, a trusted platform module (TPM) 180, and a management engine (ME) 190. NVRAM 170 can store BIOS 172, a configuration attribute file 174, and a Platform Level Data Model (PLDM) management profile 176.

Information handling system 100 can include additional components and additional busses, not shown for clarity. For example, system 100 can include multiple processor cores, audio devices, and the like. While a particular arrangement of bus technologies and interconnections is illustrated for the purpose of example, one of skill will appreciate that the techniques disclosed herein are applicable to other system architectures. System 100 can include multiple CPUs and redundant bus controllers. One ore more components can be integrated together. For example, portions of northbridge/chipset 106 can be integrated within CPU 102. Additional components of information handling system 100 can include one or more storage devices that can store machine-executable code, one or more communications ports for communicating with external devices, and various input and output (I/O) devices, such as a keyboard, a mouse, and a video display. An example of information handling system 100 includes a multi-tenant chassis system where groups of tenants (users) share a common chassis, and each of the tenants has a unique set of resources assigned to them. The resources can include blade servers of the chassis, input/output (I/O) modules, Peripheral Component Interconnect-Express (PCIe) cards, storage controllers, and the like.

For purpose of this disclosure information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smart phone, a tablet device or other consumer electronic device, a network server, a network storage device, a switch, a router, or another network communication device, or any other suitable device and may vary in size, shape, performance, functionality, and price. Further, information handling system 100 can include processing resources for executing machine-executable code, such as CPU 102, a programmable logic array (PLA), an embedded device such as a System-on-a-Chip (SoC), or other control logic hardware. Information handling system 100 can also include one or more computer-readable medium for storing machine-executable code, such as software or data.

ME 190 can be configured to provide out-of-band access to devices at information handling system 100. As used herein, out-of-band access refers to operations performed independent of an operating system executing at system 100, including operations performed prior to execution of BIOS 172 by processor 102 to initialize operation of system 100. In an embodiment, ME 190 can be compliant with Intel Active Management Technology (AMT). AMT is hardware and firmware technology to provide remote out-of-band management of system 100. AMT can include support for the Desktop and mobile Architecture for System Hardware (DASH) standards, promulgated by the Distributed Management Task Force, Inc. (DTMF), an organization promoting system management and interoperability standards. NVRAM 170 can store ME firmware and other management data in a ME region associated with the ME. In an embodiment, the ME region can store BIOS configuration attribute data according to a DTMF PLDM standard, illustrated by PLDM 176.

BIOS 172 can be referred to as a firmware image, and the term BIOS is herein used interchangeably with the term firmware image, or simply firmware. BIOS 172 includes instructions executable by CPU 102 to initialize and test the hardware components of system 100, and to load a boot loader or an operating system (OS) from a mass storage device. BIOS 172 additionally provides an abstraction layer for the hardware, i.e. a consistent way for application programs and operating systems to interact with the keyboard, display, and other input/output devices. When power is first applied to information handling system 100, the system begins a sequence of initialization procedures. During the initialization sequence, also referred to as a boot sequence, components of system 100 are configured and enabled for operation, and device drivers can be installed. Device drivers provide an interface through which other components of the system 100 can communicate with a corresponding device.

In an embodiment, the BIOS 172 can be substantially compliant with one or more revisions of the UEFI specification. The UEFI standard replaces the antiquated personal computer BIOS system found in some older information handling systems. However, the term BIOS is often still used to refer to the system firmware. The UEFI specification provides standard interfaces and interoperability guidelines for devices that together make up an information handling system. In particular, the UEFI specification provides a standardized architecture and data structures to manage initialization and configuration of devices, booting of platform resources, and passing of control to the operating system. The UEFI specification allows for the extension of platform firmware by loading UEFI driver and UEFI application images. For example, an original equipment manufacturer can include customized or proprietary images to provide enhanced control and management of the information handling system 100. While the techniques disclosed herein are described in the context of a UEFI compliant system, one of skill will appreciate that aspects of the disclosed systems and methods can be implemented at substantially any information handling system having configurable firmware. Version 2.1 of the UEFI specification introduced the Human Interface Infrastructure (HII), which is designed to give the platform firmware centralized control over how input, output, and system configuration are managed. The HII also includes information such as fonts, bitmaps, forms, and protocols for routing of configuration information between subsystems of the information handling system.

Figure 2:
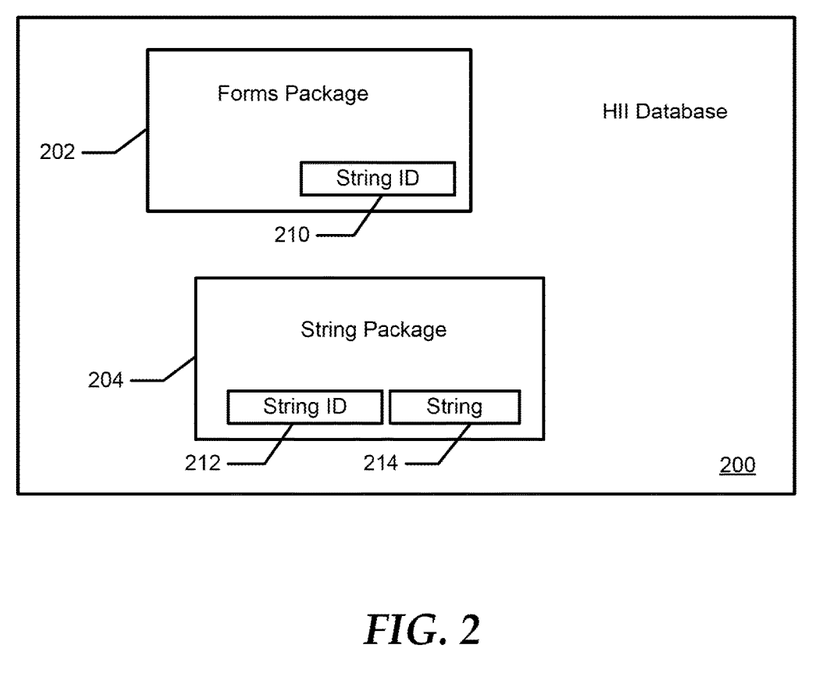
FIG. 2 is a block diagram of a Human Interface Infrastructure (HII) database according to a specific embodiment of the present disclosure.

FIG. 2 shows a HII database 200 according to a specific embodiment of the present disclosure. The HII database 200 can be used to store configuration information associated with UEFI compliant devices and device drivers included at an information handling system, such as the information handling system 100. The UEFI specification provides a standardized way in which firmware can communicate with a user or application software concerning firmware related settings. The HII also supports presentation of the configurable information in any desired language, such as English and French, by associating objects and object attributes with a string identifier, which is a number that can be mapped to a corresponding string of a particular language. The HII database 200 includes a forms package 202 and a string package 204. The forms package 202 includes a representative string ID 210, and the string package 204 includes a representative string ID 210 and a corresponding string 212. The HII database 200 may include other packages (not shown), such as a font package.

Forms provide a dialog interface through which a user or an application program can query or manipulate the configuration of one or more devices at an information handling system. Each opportunity to modify a configurable attribute of a respective device is referred to as a question. A form can present a question along with a set of options enumerated by the question. An individual system device can be associated with more than one question. The forms are stored in an HII database, such as the HII database 200, along with strings, fonts, and images. The various objects and attributes of the forms are encoded using an Internal Forms Representation (IFR), each object included therein consisting of a byte stream. The IFR is a compiled version of a UEFI Visual Forms Representation (VFR). A forms browser provides a forms-based user interface, which understands how to read the contents of the forms, interact with the user, and save the resulting configuration values. Other applications, such as a form-processor, may use the information within the forms to query configuration setting values without providing a user interface. Forms data can be installed by an application or by a device driver during initialization of the HII database. The forms browser organizes the forms so that a user may navigate between forms, select the individual questions, and change the values using human interface devices at the information handling system, such as the video display 110, the keyboard 112, and the mouse 114 at the information handling system 100.

The HII specification provides application programming interfaces (APIs) to allow drivers, including those on plug-in cards, to have full access to HII resources, including forms, strings, and fonts, and be able to contribute additional resources. An HII database typically does not represent a single memory storage device, but instead includes a data structure for identifying one or more memory devices that comprise the HII database. For example, a UEFI compliant hardware device, such as network interface controller 140, can include an internal memory device, such as a NVRAM, for storing device driver attributes including information represented in the HII database. The UEFI specification provides access protocols to access and manipulate HII configuration information. For example, the EFI_HII_CONFIG_ACCESS_PROTOCOL provides an ExtractConfig( ) function to retrieve a current configuration setting, and a RouteConfig( ) function to change the current configuration setting. Configuration information is stored in the form of HII strings, including UEFI configuration language strings.

The HII database 200 acts as a repository for configuration and user-interface resources, including forms, fonts, strings, images, animations, and keyboard layouts. The platform and individual drivers can install, modify, and remove these resources. The UEFI BIOS 172 provides a uniform environment for users and applications to access configuration information, and is responsible for administering the sequence of steps necessary to initialize (boot) the information handling system 100. The HII includes a HII forms browser, which provides a user-interface where forms can be displayed and input from the user is acquired in order to update configuration settings. Forms information is stored in a forms package, such as the forms package 202. A forms package can include multiple form sets, and each form set can include multiple forms. For example, access to all configuration information associated with the network controller 120 can be administered by a collection of forms included in a shared forms package.

Alpha-numeric text displayed within a form is included at one or more corresponding string packages. Each string package includes text in one language, and multiple languages can be supported at an information handling system by providing string packages corresponding to each of the desired languages. The information handling system 100 can be configured to support a language other than English, such as Spanish, by simply directing the UEFI to access string information from a string package associated with the desired language. In this way, configuration data administered via the forms packages can be maintained in a language-independent manner, while the configuration data and user-interface can be presented to a user in their native language. Objects referenced within a form package are assigned a unique string identifier. This string identifier can be used to retrieve a string associated with the referenced object from a corresponding strings package. For example, a string 212 associated with a system attribute referenced at the forms package 202 using the string ID 210 can be retrieved from the string package 204 using the string ID 210.

A UEFI driver or application may provide a forms-based interface to present individual configuration settings available at an information handling system. Each configuration setting can be associated with an HII question. An HII question is a type of HII statement that has a value, and the value corresponds to a configuration setting for the information handling system. A form, included at a forms package, may present one or more questions and an interface though which a user or an application program can select between a set of provided configuration options. For example, an HII question may represent an option to enable or disable a Universal Serial Bus (USB) port. Form data associated with an HII question includes a pointer to where the associated configuration data is stored, an Op-code to identify a type of HII question, and other information pertinent to each type of question. For example, the HII question Op-code "EFI_IFR_ORDERED_LIST_OP" can be used to specify a boot-order of a set of bootable devices.

Each HII question has an associated identifier known as a Question Prompt Token. This identifier is a string ID that can be used to retrieve a corresponding string (question prompt string) from any of a set of a set of available string packages associated with the forms package. A question may include one or more options representing a selection of values associated with the question. Like other objects referenced by a form, each option is associated with a string (question option string) stored at a string package and referenced by a unique string ID. Thus, a form can refer to questions, configuration settings, values, etc. in a language-independent manner by instead referencing these objects within a form using a respective string ID.

In addition to string packages associated with human-readable languages, version 2.1 of the UEFI specification introduced the concept of a UEFI configuration language (XUEFI) and associated configuration language string packages. A UEFI configuration language string package is similar to a human-readable language string package. Thus, a string ID included in a forms package can be used to retrieve a corresponding string from any of available language packages, including the UEFI configuration language string package. Unlike the human-language string packages, configuration language strings typically are not displayed within a user-manipulated configuration form. Instead, application programs, such as configuration programs, can retrieve strings stored at a UEFI configuration language string package. The UEFI configuration language can be used to map HII Questions to pre-defined keywords, such as an HII configuration attribute. One example of such keywords is the Distributed Management Task Force (DMTF) Attributes defined in the DMTF Common Information Model (CIM) BIOS Management Profile. HII configuration attributes can include industry-standard BIOS attributes, such as those defined in the DMTF BIOS Attributes Registry, or they can be specific to a particular information handling system vendor. An HII configuration attribute can include an alphanumeric string that identifies a device or other object whose configuration can be altered, a configuration option at a device, an HII question prompt identifier, an option associated with an HII question, and the like. As used herein, the terms HII configuration attribute, BIOS attribute, and system attribute are used synonymously.

HII questions are uniquely identified within an HII form set using a respective sixteen-bit Question Identifier. The Question Identifier, along with a UEFI Device Path, and a Form Set Identifier (typically a globally unique identifier (GUID)), uniquely identifies a configuration setting within the information handling system. This set of identifiers is suitable for use by the UEFI BIOS to administer device configuration options.

BIOS configuration attribute data can be represented using a PLDM compliant table, also referred to as a PLDM management profile. As described herein, PLDM management profile 176 is generated first by parsing IFR information to extract a list of configuration attributes. The attribute list is used to generate configuration attribute file 174. Configuration attribute file 174 is typically generated at the time that the BIOS image 172 is generated, and subsequently stored at BIOS NVRAM 170 as part of image 172. The configuration attribute file 174 represents a baseline configuration of system attributes for information handling system 100. At any given time, the configuration of system 100 can change, so it is necessary to determine current values of configuration attributes identified in the configuration attribute file 174 before PLDM 176 can be generated. As disclosed herein, the updating and PLDM generation steps are performed during BIOS initialization of information handling system 100. These techniques are described below with reference to FIGS. 3 and 4.

Figure 3:
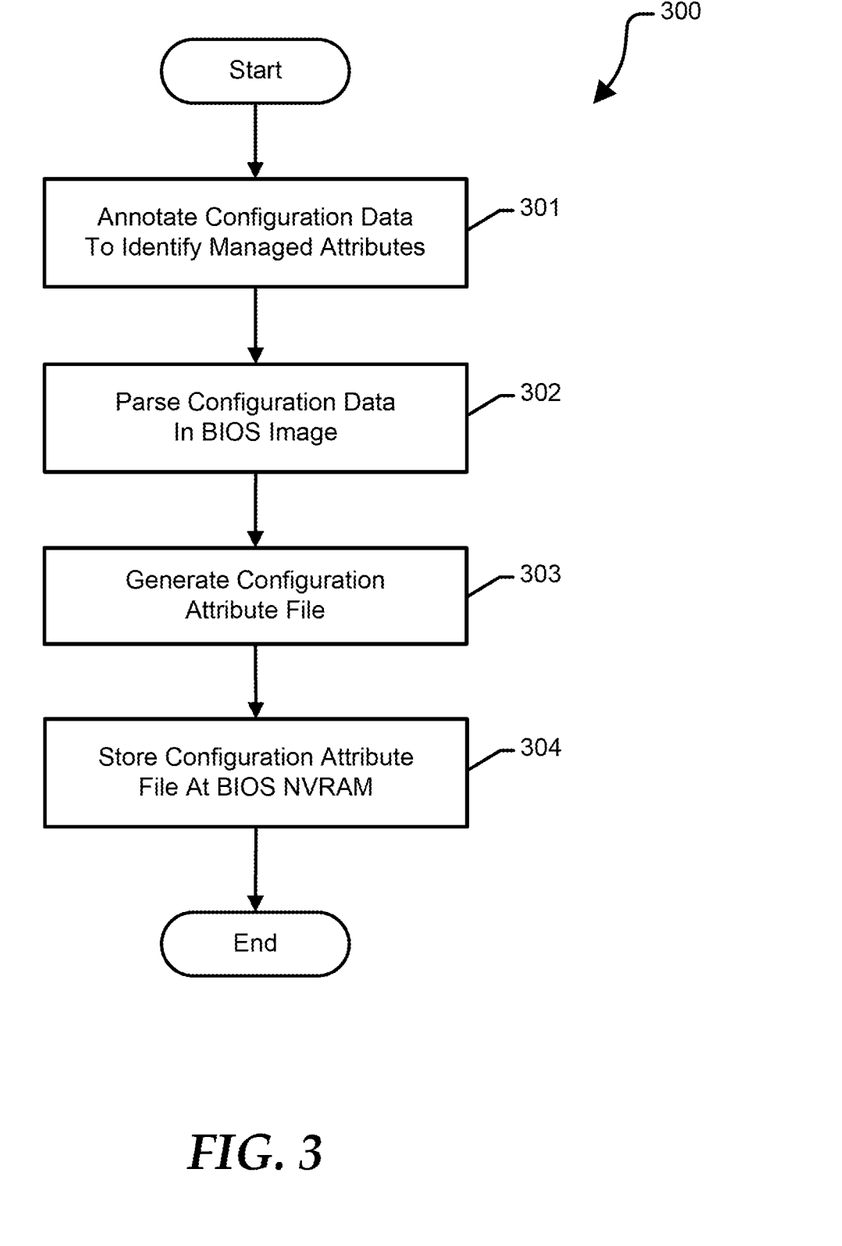
FIG. 3 is a flow diagram illustrating the generation of a configuration attribute file according to a specific embodiment of the present disclosure.

FIG. 3 shows a method 300 for generating configuration attribute file 174 according to a specific embodiment of the present disclosure. Method 300 begins at block 301 where selected configuration data contained in a VFR file can be annotated with a proprietary property identifier to identify that the attributes should be parsed and ultimately included in PLDM 176. The property identifier will be maintained in the compiled IFR file. The method proceeds to block 302 where the IFR file is parsed to identify all configuration attributes that were identified at block 301, along with the attribute's corresponding baseline value. The IFR (HII IFR OpCode and HII Language resource files) is parsed by resolving IFR statements, including type, attributes (prompt string, help string), display enable/disable, question item, variable (default values, current values), and the like. In an embodiment IFR file can be parsed prior to incorporation of the IFR file at a BIOS image. In another embodiment, the IFR file can be incorporated into a BIOS image and the image can be parsed to extract the configuration data needed to generate configuration attribute file 174. The parsing can take a substantial amount of time to perform, which can negatively impact the initialization time of information handling system 100 if performed during execution of BIOS image 172. Accordingly, the parsing can be performed during build time of image 172, or at another time prior to initialization of system 100.

At block 303, configuration attribute file 174 is generated based on the information parsed from the IFR at block 302. At block 304, configuration attribute file 174 is stored at BIOS NVRAM 170, as is BIOS image 172. One of skill will appreciate that the storing of configuration attribute file 174 and image 172 can be performed by the original equipment manufacturer during production of system 100, by a user of when updating BIOS image 172 at system 100, or at another time. In either case, configuration attribute file 174 is present and available at BIOS NVRAM 170 prior to power-on-self-test (POST) and firmware initialization of information handling system 100.

Figure 4:
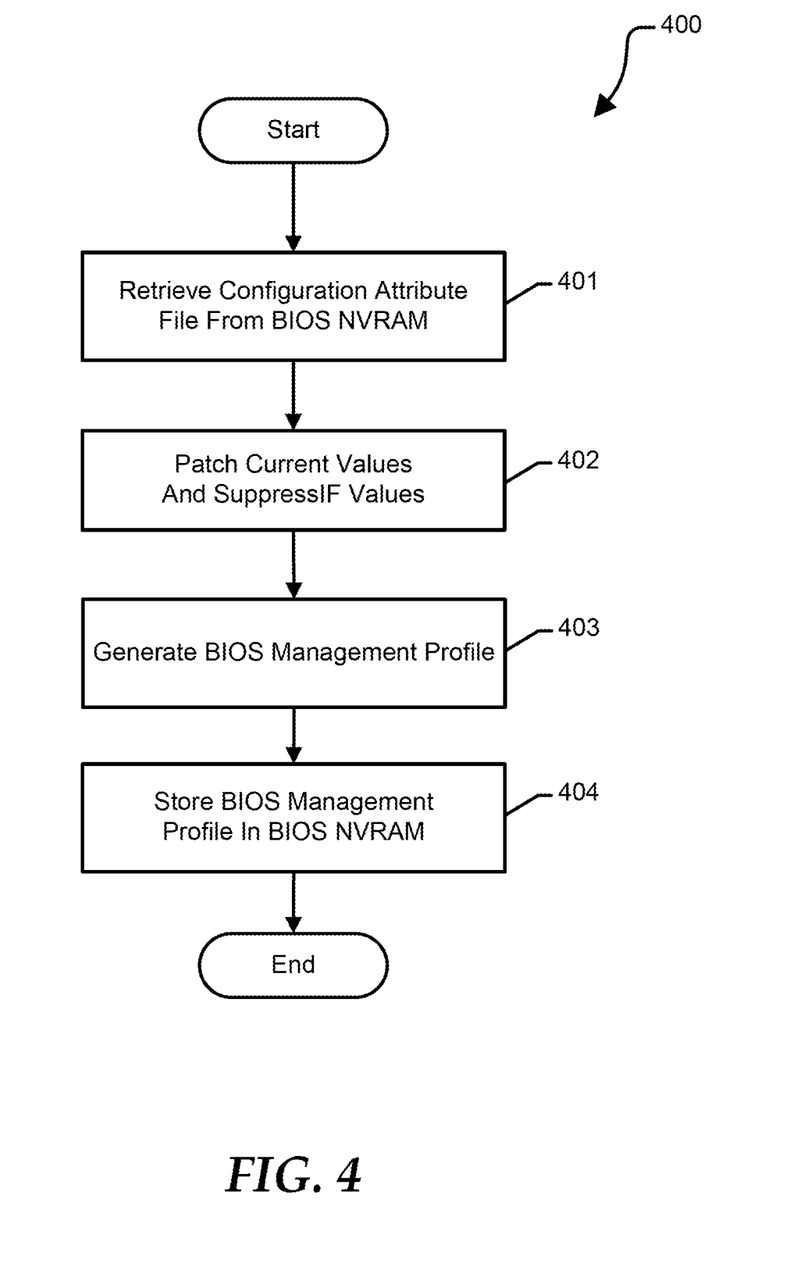
FIG. 4 is a flow diagram illustrating the generation of a PLDM management profile according to a specific embodiment of the present disclosure.

FIG. 4 shows a method 400 for generating PLDM management profile 176 according to a specific embodiment of the present disclosure. Method 400 begins at block 401 where configuration attribute file 174 is retrieved from BIOS NVRAM 170 during firmware initialization of information handling system 100, and in particular during the Driver Execution Environment (DXE) phase of the UEFI compliant boot process. At block 402, intrinsic BIOS instructions are executed to access variable store resources to retrieve updated attribute and SuppressIf values (strings) for attributes enumerated in configuration attribute file 174. Method 400 continues at block 403 where a BIOS management profile, such as PLDM 176 is generated based on the attributes identified in configuration attribute file 174 and based on the updated values determined at block 402. Method 400 concludes at block 404 where the management profile is saved at BIOS NVRAM 170 or at another storage location at information handling system 100. For example, PLDM 176 can be stored at a partition of NVRAM 176 that is associated with operation of management engine 190. Once PLDM management profile 176 has been stored, the information is available to management engine 190, and accessible via out-of-band techniques to system administration or management systems that are remote to information handling system 100. The PLDM management profile can also be accessible to in-band processes.

Referring back to FIG. 1, the information handling system 100 can include a set of instructions that can be executed to cause the information handling system to perform any one or more of the methods or computer based functions disclosed herein. The information handling system 100 may operate as a standalone device or may be connected to other computer systems or peripheral devices, such as by a network.

In a networked deployment, the information handling system 100 may operate in the capacity of a server or as a client user computer in a server-client user network environment, or as a peer computer system in a peer-to-peer (or distributed) network environment. The information handling system 100 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 100 can be implemented using electronic devices that provide voice, video or data communication. Further, while a single information handling system 100 is illustrated, the term "system" shall also be taken to include any collection of systems or sub-systems that individually or jointly execute a set, or multiple sets, of instructions to perform one or more computer functions.

The information handling system 100 can include a disk drive unit and may include a computer-readable medium, not shown in FIG. 1, in which one or more sets of instructions, such as software, can be embedded. Further, the instructions may embody one or more of the methods or logic as described herein. In a particular embodiment, the instructions may reside completely, or at least partially, within system memory 104 or another memory included at system 100, and/or within the processor 102 during execution by the information handling system 100. The system memory 104 and the processor 102 also may include computer-readable media. A network interface device (not shown at FIG. 1) can provide connectivity to a network, e.g., a wide area network (WAN), a local area network (LAN), or other network.

In an alternative embodiment, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions or receives and executes instructions responsive to a propagated signal; so that a device connected to a network can communicate voice, video or data over the network. Further, the instructions may be transmitted or received over the network via the network interface device.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A method comprising:
annotating Visual Forms Representation (VFR) data with a property identifier to identify configuration attributes to be included at a Platform Level Data Model (PLDM) management profile;
parsing Internal Forms Representation (IFR) data to collect the configuration attributes identified by the property identifier, the configuration attributes defining configurable features at an information handling system;
generating a configuration attribute file including the configuration attributes parsed from the IFR data;
including the configuration attribute file at a basic input/output system (BIOS) image; and
storing the BIOS image at a BIOS non-volatile random-access memory (NVRAM) at the information handling system, the configuration attribute file accessible during initialization of the information handling system by BIOS instructions.

2. The method of claim 1, further comprising:
accessing the configuration attribute file at the BIOS NVRAM by the BIOS instructions during initialization of the information handling system;
determining current values of the configuration attributes identified in the configuration attribute file;
generating the PLDM management profile based on the current values; and
storing the PLDM management profile at the information handling system.

3. The method of claim 1, wherein the parsing, generating, and storing are performed prior to initialization of the information handling system and at a location other than at the information handling system.

4. The method of claim 1, wherein the BIOS image is a Unified Extensible Firmware Interface (UEFI) image.

5. The method of claim 1, wherein the IFR data includes a Human Interface Infrastructure (HII) opcode resource file and an HII language resource file.

6. The method of claim 1, wherein the annotation identifies configuration attributes at the information handling system that are visible to a management system remote to the information handling system, the management system providing out-of-band configuration management at the information handling system.

7. A method comprising:
accessing a configuration attribute file from a basic input/output system (BIOS) non-volatile random-access memory (NVRAM) at an information handling system, the configuration attribute file generated during a BIOS image build time based on annotation included at Visual Forms Representation (VFR) data, the accessing during execution of BIOS instructions during initialization of the information handling system;
accessing Human Interface Infrastructure (HII) Internal Forms Representation (IFR) data included at the BIOS;
determining current values of the configuration attributes identified in the configuration attribute file based on the IFR data;
generating a Platform Level Data Model (PLDM) management profile based on the current values; and
storing the PLDM management profile at the information handling system.

8. The method of claim 7, further comprising:
parsing BIOS information to collect configuration attributes configurable by a management system;
generating the configuration attribute file based on the configuration attributes;
including the configuration attribute file at a BIOS image; and
storing the BIOS image at a BIOS NVRAM.

9. The method of claim 8, wherein the parsing of the BIOS information, the generating of the configuration attribute file, and the storing of the configuration file are performed prior to initialization of the information handling system and at a location other than at the information handling system.

10. The method of claim 8, further comprising annotating the VFR data to identify the configuration attributes to be parsed.

11. The method of claim 10, wherein the annotation identifies configuration attributes at the information handling system that are visible to a management system remote to the information handling system, the management system providing out-of-band configuration management at the information handling system based on the PLDM management profile.

12. The method of claim 8, wherein the BIOS image is a Unified Extensible Firmware Interface (UEFI) image and the parsing further comprises parsing the IFR data.

13. The method of claim 7, wherein updating the configuration attribute file further comprises determining current SuppressIf values.

14. An information handling system comprising:
a management engine (ME) operable to provide out-of-band management services at the information handling system; and
a non-volatile random-access memory (NVRAM) for storing:
a Unified Extensible Firmware Interface (UEFI) basic input/output system (BIOS) including Internal Forms Representation (IFR) data;
a configuration attribute file identifying attributes configurable by a management system, the configuration attribute file generated prior to initialization of the information handling system based on the IFR data, the configuration attribute file accessible by BIOS instructions during initialization of the information handling system; and
a Platform Level Data Model (PLDM) management profile, the PLDM management profile accessible by the ME and generated during BIOS initialization of the information handling system based on current values of the configuration attributes identified in the configuration attribute file.

15. The information handling system of claim 14, wherein the configuration attribute file is generated by parsing the IFR data to identify configuration attributes identified by a designated property identifier, the parsing performed at a location other than at the information handling system.

16. The information handling system of claim 14, wherein the BIOS includes instructions executable by a processor during initialization of the system to:
access the configuration attribute file at the NVRAM;
determine current values of configuration attributes identified in the configuration attribute file;
generate the Platform Level Data Model (PLDM) management profile based on the current values; and
store the PLDM management profile at the information handling system.

17. The information handling system of claim 14, where in the PLDM management profile is accessible, via the ME, by the management system, the management system remote to the information handling system.

18. The information handling system of claim 14, wherein the PLDM management profile is stored at the NVRAM at a partition associated with the ME.

* * * * *